United States Patent [19]

Visco

[11] 4,426,885
[45] Jan. 24, 1984

[54] DEVICE FOR INDICATING THE THICKNESS OF ICE

[76] Inventor: John Visco, 334 Jeffer St., Ridgewood, N.J. 07450

[21] Appl. No.: 416,218

[22] Filed: Sep. 9, 1982

[51] Int. Cl.³ .............................................. G01B 5/02
[52] U.S. Cl. .................................... 73/432 R; 73/305; 73/322.5; 116/200; 116/228
[58] Field of Search .................. 73/305, 322.5, 170 A, 73/432 G; 441/1, 23, 6, 7, 28; 116/200, 227, 228

[56] References Cited

U.S. PATENT DOCUMENTS

| | | | |
|---|---|---|---|
| 1,396,743 | 11/1921 | Gray et al. | 73/448 |
| 3,431,568 | 5/1966 | Brown | 441/6 |
| 3,517,399 | 3/1966 | Horowitz et al. | 441/23 |

*Primary Examiner*—S. Clement Swisher
*Attorney, Agent, or Firm*—Bachman and LaPointe

[57] ABSTRACT

A device for measuring the thickness of an ice layer comprises a hollow, watertight body formed by two cones joined at their bases. The interior of the device is provided with a medium which acts as a ballast and allows the device to float on the surface of the water. The device is anchored in place by an elastically deformable line secured to a weight such that the device is pushed upwardly by the pressure exerted when an ice layer is formed. The device is provided with indicia on the surface thereof to indicate the thickness of the ice layer being formed.

8 Claims, 2 Drawing Figures

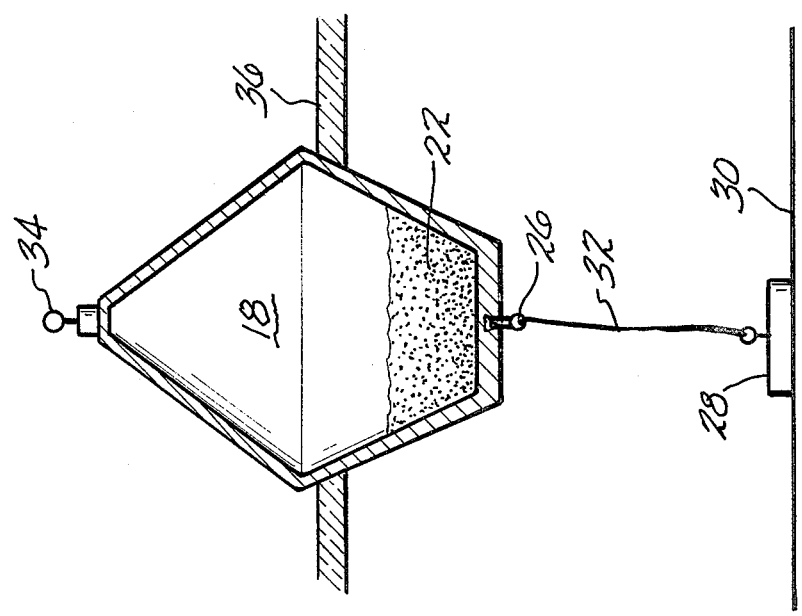
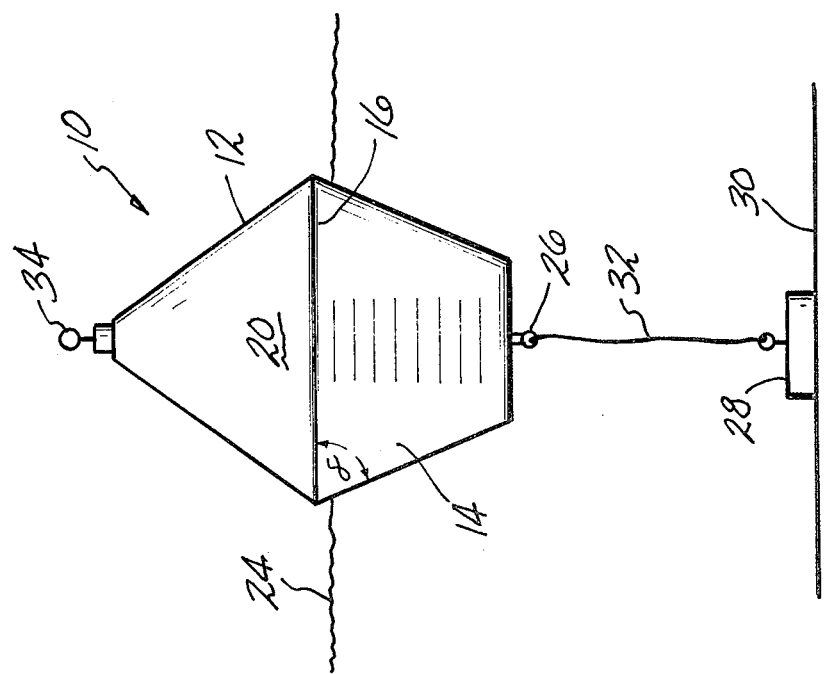

DEVICE FOR INDICATING THE THICKNESS OF ICE

BACKGROUND OF THE INVENTION

The present invention relates to a method and apparatus for measuring the thickness of an ice layer, and more particularly, a method and apparatus for measuring the thickness of an ice layer automatically without the need of transversing the ice layer.

It is necessary for ice boaters, ice skaters, ice fishermen and the like to measure the thickness of an ice layer to determine whether the layer is of sufficient thickness to support the activity they intend to conduct. Heretofore, the most common method for determining the thickness of an ice layer involves an individual actually going out on the ice, boring a hole through the ice layer and measuring same. While the foregoing method provides an accurate reading, it subjects the individual taking the reading to a certain amount of safety risks. Naturally, it would be highly desirable to provide a method and apparatus for automatically measuring the thickness of an ice layer without requiring an individual to actually transverse the ice layer.

Accordingly, it is the principal object of the present invention to provide a method and apparatus for automatically measuring the thickness of an ice layer.

It is a particular object of the present invention to provide a method and apparatus for automatically measuring the thickness of an ice layer without requiring the ice to be crossed.

It is a further object of the present invention to provide a device for automatically measuring the thickness of an ice layer which is simple in construction and inexpensive to manufacture.

Further objects and advantages of the present invention will appear hereinbelow.

SUMMARY OF THE INVENTION

In accordance with the present invention, the foregoing objects and advantages are readily obtained.

The present invention relates to a method and apparatus for automatically measuring the thickness of an ice layer without requiring one to transverse the ice. In accordance with the apparatus of the present invention, a hollow, watertight body formed by two cones joined at their bases is provided on the interior thereof with a medium which acts as a ballast and allows the device to float on the surface of the water at a predetermined depth. The watertight body is secured to a weight by means of an elastically deformable line. The body is provided on the surface thereof with indicia for indicating the thickness of an ice layer. In accordance with the method of the present invention, as the water freezes to form an ice layer, the pressure of the forming ice layer acts on the surface of the inverted cone of the hollow, watertight body and biases the body upwards against the force of the elastically deformable line. The greater the thickness of the ice layer, the farther the body is biased upwards. The thickness of the ice layer is indicated by indicia provided on the inverted cone.

In accordance with the present invention, an inexpensive device of simple construction allows for one to automatically determine the thickness of an ice layer without requiring one to actually venture out onto the ice. Because of the inexpensive nature of the device, a plurality of the devices may be located at various locations in a body of water to provide detailed information on the ice thickness.

BRIEF DESCRIPTION OF THE DRAWINGS

FIG. 1 is a partial sectional view of the device of the present invention in its ice measuring state.

FIG. 2 is a sectional view of the device of the present invention.

DETAILED DESCRIPTION

Referring to FIGS. 1 and 2, the ice measuring device 10 of the present invention comprises a first upper hollow cone shaped portion 12 and a second lower inverted hollow frustum of a cone portion 14. Portions 12 and 14 are joined together at bases 16 by any suitable means such as glue. So as to form a hollow, watertight body 20, it is preferred that portions 12 and 14 be made of plastic; however, other materials such as metals, ceramic and the like could be employed. The interior 18 of the hollow body is filled with a medium 22 which acts as a ballast and allows the body to float in water such that the joint of the bases 16 lies above the surface of the water 24. The bottom of inverted frustum 14 is provided with a connector 26 for securing the body 20 to a weight 28 which lies on the floor 30 of a body of water. An elastically deformable line 32 secures the body 20 to the weight 28 so as to anchor the body 20 in place. In its normal floating condition, line 32 should be loose. If desired, the upper cone portion 12 can be provided with a connector 34. Provided on the surface of the inverted frustum 14 is indicia for indicating the thickness of the ice layer. The indicia may be a color code, a simple ruler, or any other suitable indicating means.

It is critical to the present invention that the angle α formed between the joint 16 and the walls of frustum 14 be between 45° and 65° and preferably between 50° and 60° in order to provide a sufficient surface for the ice layer to act against. The medium 22 can be any suitable medium such as water, sand, metal shot or the like.

The operation of the device of the present invention is as follows. As an ice layer 36 forms, the ice acts on the walls of frustum 14 of body 20 raising the body 20 above the level of the ice layer 36 a proportional amount. As the ice layer 36 gets thicker, the force acting on frustum 14 is greater thereby raising body 20 higher against the force of line 30. As the ice layer 36 melts, the body settles back a proportional amount due to the reduction in force exerted by the ice layer 36 and the force of line 32. The height of the body 20 above the surface of the ice layer 36 is indicated by the indicia on the body and can be readily seen from the shore. Thus, the present invention allows for the thickness of the ice layer to be readily determined without requiring one to go out onto the ice and risk falling through.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for indicating the thickness of an ice layer on the surface of a body of water comprising a hollow, watertight body, said hollow, watertight body having a ballasting medium positioned within said hollow, watertight body for allowing said hollow, watertight body to float on the surface of said body of water at a predetermined height, and indicia means provided on the external surface of said hollow, watertight body whereby said hollow, watertight body is biased upwards by the force of an ice layer being formed on the surface of said body of water such that the thickness of the ice layer formed is indicated by the indicia on said hollow, watertight body.

2. A device according to claim 1 wherein said hollow, watertight body is in the form of an inverted frustum.

3. A device according to claim 2 wherein the angle formed between the base of the inverted frustum and the sidewall thereof is from about 45° to 65°.

4. A device according to claim 2 wherein the angle formed between the base of the inverted frustum and the sidewall thereof is from about 50° to 60°.

5. A device according to claim 1 wherein said hollow, watertight body is in the form of a frustum of a cone.

6. A device according to claim 1 wherein a weight is secured to said hollow, watertight body by an elastically deformable line.

7. A device according to claim 1 wherein said indicia consists of color coding.

8. A method for indicating the thickness of an ice layer on the surface of a body of water comprising providing a hollow, watertight body, positioning a ballasting medium within said hollow, watertight body, providing indicia on the external surface of said hollow, watertight body and locating said hollow, watertight body in said body of water such that said hollow, watertight body floats on the surface thereof and is biased upwards by the force of an ice layer being formed thereby indicating the thickness of the ice layer.

* * * * *